(12) United States Patent
Zhang et al.

(10) Patent No.: US 10,635,279 B2
(45) Date of Patent: Apr. 28, 2020

(54) METHOD FOR SCREENSHOT A SPECIAL-SHAPED SCREEN AND RELATED PRODUCTS

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/182,945

(22) Filed: Nov. 7, 2018

(65) Prior Publication Data
US 2019/0179520 A1 Jun. 13, 2019

(30) Foreign Application Priority Data
Dec. 11, 2017 (CN) .......................... 2017 1 1311226

(51) Int. Cl.
*G06F 3/0484* (2013.01)
*G06T 3/60* (2006.01)
*G06T 11/60* (2006.01)

(52) U.S. Cl.
CPC ...... *G06F 3/04845* (2013.01); *G06F 3/04842* (2013.01); *G06T 3/60* (2013.01);
(Continued)

(58) Field of Classification Search
CPC ......... G06T 3/4038; G06T 3/60; G06T 11/60; G06T 2200/24; G06T 2210/22; G06F 3/04842; G06F 3/04845
See application file for complete search history.

(56) References Cited

U.S. PATENT DOCUMENTS

| | | | |
|---|---|---|---|
| 2014/0241635 A1* | 8/2014 | Ruppaner | G06K 9/00228 382/197 |
| 2014/0375692 A1 | 12/2014 | Kuraki et al. | |
| 2018/0359107 A1* | 12/2018 | Asher | H04L 12/1831 |

FOREIGN PATENT DOCUMENTS

| | | |
|---|---|---|
| CN | 103514581 A | 1/2014 |
| CN | 104951729 A | 9/2015 |

(Continued)

OTHER PUBLICATIONS

International search report issued in corresponding international application No. PCT/CN2018/112698 dated Feb. 2, 2019.
(Continued)

*Primary Examiner* — Jeffery A Brier
(74) *Attorney, Agent, or Firm* — Young Basile Hanlon & MacFarlane, P.C.

(57) ABSTRACT

A method for screenshot and related products are provided, which are applicable to an electronic device. The method for screenshot includes the following. A preset interface is displayed in a special-shaped region and a regular-shaped region of a special-shaped screen, and a first screenshot of the preset interface in a first screen status is obtained. A second screenshot is obtained by inversing the preset interface and performing a screenshot on the preset interface inversed. A synthesized screenshot is obtained by synthesizing the first screenshot and the second screenshot, where the synthesized screenshot is a complete screenshot.

20 Claims, 10 Drawing Sheets

(52) U.S. Cl.
CPC .......... *G06T 11/60* (2013.01); *G06T 2200/24* (2013.01); *G06T 2210/22* (2013.01)

(56) References Cited

FOREIGN PATENT DOCUMENTS

| | | |
|---|---|---|
| CN | 105045485 A | 11/2015 |
| CN | 105278824 A | 1/2016 |
| CN | 105302429 A | 2/2016 |
| CN | 106385550 A | 2/2017 |
| CN | 107436714 A | 12/2017 |

OTHER PUBLICATIONS

Extended European search report issued in corresponding European application No. 18204529.4 dated Apr. 17, 2019.
Jonathan Jilaxzone: "How to take Screenshots on iPhone X and How does it look like? Will the Notch be there?—Jilaxzone", Nov. 9, 2017 (Nov. 9, 2017), XP055576925, Retrieved from the Internet: URL:https://www.jilaxzone.com/2017/II/09/how-to-take-screenshots-on-iphone-x-and-how-does-it-look-like-will-the-notch-be-there/ [retrieved on Apr. 3, 2019]; the whole document.

* cited by examiner

METHOD FOR SCREENSHOT A SPECIAL-SHAPED SCREEN AND RELATED PRODUCTS

CROSS-REFERENCE TO RELATED APPLICATION(S)

This application claims priority to Chinese Patent Application No. 201711311226.3, filed on Dec. 11, 2017, the content of which is hereby incorporated by reference in its entirety.

TECHNICAL FIELD

The present disclosure relates to the field of electronic devices, and particularly relates to a method for screenshot and related products.

BACKGROUND

With the popularization of electronic devices (mobile phones, tablet PCs, etc.), the electronic device can support more and more applications and become more powerful. The electronic devices develop towards diversification and individuation, and become essential electronic products in users' lives.

At present, special-shaped screens (such as, bangs-style screens) have received more and more attention from the users. However, the special-shaped screens, unlike mainstream rectangular screens, present profiled structures, such that a screenshot of the special-shaped screen is presented in a special-shaped structure as that of the special-shaped screen, affecting the user experience. Thus, how to achieve a complete screenshot on a special-shaped screen has become an urgent problem to be solved.

SUMMARY

Implementations of the present disclosure provide a method for screenshot and related products.

According to a first aspect of the present disclosure, an electronic device is provided. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen.

The special-shaped screen is configured to display a preset interface in the special-shaped region and the regular-shaped region.

The circuit is configured to obtain a first screenshot of the preset interface in a first screen status, to obtain a second screenshot by inversing the preset interface and performing a screenshot on the preset interface inversed in a second screen status, and to obtain a synthesized screenshot by synthesizing the first screenshot and the second screenshot, where the synthesized screenshot is a complete screenshot.

According to a second aspect of the present disclosure, a method for screenshot is provided. The method for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The method for screenshot includes the following.

A preset interface is displayed in the special-shaped region and the regular-shaped region of the special-shaped screen, and a first screenshot of the preset interface in a first screen status may be obtained. A second screenshot may be obtained by inversing the preset interface and performing a screenshot on the preset interface inversed. A synthesized screenshot may be obtained by synthesizing the first screenshot and the second screenshot, where the synthesized screenshot is a complete screenshot.

According to a third aspect of the present disclosure, a non-transitory computer readable storage medium for storing computer programs is provided. The computer programs cause a computer to execute instructions of some or all of the steps/operations as described in the second aspect of the implementations of the present disclosure.

BRIEF DESCRIPTION OF THE DRAWINGS

To illustrate the technical solutions embodied by the implementations of the present disclosure more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1A:
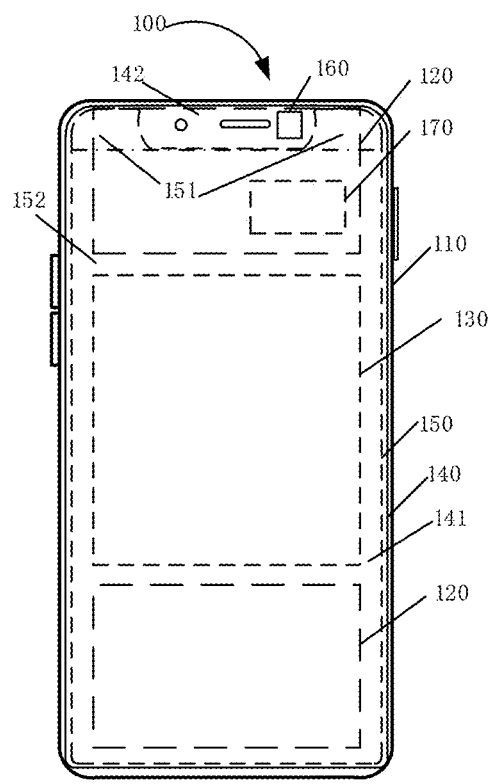
FIG. 1A is a schematic structure diagram illustrating an exemplary electronic device according to implementations of the present disclosure.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms such as "first" and "second" used in the specification, the claims, and the accompanying drawings of the present disclosure are used for distinguishing between different objects rather than describing a particular order. The terms "include" and "comprise" as well as variations thereof are intended to cover non-exclusive inclusion. For example, a process, method, system, product, device, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices having wireless communication functions, in-vehicle devices, wearable devices, computing devices, or other processing devices connected to the wireless modem, as well as various forms of user equipment (UE), mobile stations (MS), terminal devices, and the like. For the convenience of description, the above-mentioned devices are collectively referred to as an electronic device.

According to a first aspect of the present disclosure, an electronic device is provided. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen.

The special-shaped screen is configured to display a preset interface in the special-shaped region and the regular-shaped region. The circuit is configured to obtain a first screenshot of the preset interface in a first screen status, to obtain a second screenshot by inversing the preset interface and performing a screenshot on the preset interface inversed in a second screen status, and to obtain a synthesized screenshot by synthesizing the first screenshot and the second screenshot, where the synthesized screenshot is a complete screenshot.

According to a second aspect of the present disclosure, a method for screenshot is provided. The method for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The method for screenshot includes the following.

The special-shaped screen displays a preset interface in the special-shaped region and the regular-shaped region of the special-shaped screen. The circuit obtains a first screenshot of the preset interface in a first screen status. The circuit obtains a second screenshot by inversing the preset interface and performing a screenshot on the preset interface inversed. The circuit obtains a synthesized screenshot by synthesizing the first screenshot and the second screenshot, where the synthesized screenshot is a complete screenshot.

According to a third aspect of the present disclosure, a non-transitory computer readable storage medium for storing computer programs is provided. The computer programs cause a computer to execute instructions of some or all of the steps/operations as described in the third aspect of the implementations of the present disclosure.

According to a fourth aspect of the present disclosure, a method for screenshot is provided. The method for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The method for screenshot includes the following.

A preset interface is displayed in the special-shaped region and the regular-shaped region of the special-shaped screen, and a first screenshot of the preset interface in a first screen status may be obtained. A second screenshot may be obtained, by inversing the preset interface and performing a screenshot on the preset interface inversed. A synthesized screenshot may be obtained by synthesizing the first screenshot and the second screenshot, where the synthesized screenshot is a complete screenshot.

According to a fifth aspect of the present disclosure, a device for screenshot is provided. The device for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region,. The circuit board is provided with a circuit coupled with the special-shaped screen. The screen device includes a first capturing unit, a second capturing unit, and a synthesizing unit.

The first capturing unit is configured to display a preset interface in the special-shaped region and the regular-shaped region of the special-shaped screen and to obtain a first screenshot of the preset interface in a first screen status.

The second capturing unit is configured to obtain a second screenshot by inversing the preset interface (that is, rotating the preset interface 180 degrees about an axis perpendicular to the special-shaped screen) and performing a screenshot on the preset interface inversed in a second screen status.

The synthesizing unit is configured to obtain a synthesized screenshot by synthesizing the first screenshot and the second screenshot, where the synthesized screenshot is a complete screenshot.

According to a sixth aspect of the present disclosure, an electronic device is provided. The electronic device includes an application processor (AP), a memory, and one or more programs. The one or more programs are stored in the memory and configured to be executed by the AP. The programs includes instructions for some or all of steps/operations as described in the third aspect.

According to a seventh aspect of the present disclosure, a computer program product is provided. The computer program product includes a non-transitory computer readable storage medium storing computer programs. The computer programs are operative to cause a computer to perform some or all of steps/operations as described in the third aspect of the implementations of the present disclosure. The computer program product may be a software installation package.

The implementations of the present disclosure have the following advantageous effects.

The method for screenshot and the related products provided herein are applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. A preset interface is displayed in the special-shaped region and the regular-shaped region of the special-shaped screen. A first screenshot of the preset interface in a first screen status is obtained. A second screenshot is obtained by inversing the preset interface and performing a screenshot on the preset interface inversed in a second screen status. A synthesized screenshot is obtained by synthesizing the first screenshot and the second screenshot, where the synthesized screenshot is a complete screenshot. As such, a screenshot with an incomplete region as well as a screenshot with an image corresponding to the incomplete region may be obtained, and the complete screenshot may then be obtained by synthesizing the above-identified two screenshots.

The following implementations of the present application will be described in detail.

FIG. 1A is a schematic structure diagram illustrating an electronic device 100 according to the implementations of the present disclosure. The above-mentioned electronic device 100 includes a housing 110, a circuit board 120, a battery 130, and a cover plate 140. The circuit board 120, the battery 130, and the cover plate 140 are disposed on the housing 110. The cover plate 140 includes a first region 141 and a second region 142 other than the first region 141. An inner surface of the first region 141 is provided with a special-shaped screen 150. The special-shaped screen 150 includes a special-shaped region 151 (in other words, a third region) and a regular-shaped region 152 (in other words, a fourth region). The circuit board 120 is provided with a circuit 170 coupled with the special-shaped screen 150.

The circuit 170 may include an application processor (AP) and a memory. The AP is a control center of the electronic device and is configured to connect various parts of the whole electronic device through various interfaces and lines, to run or execute software programs and/or modules stored in the memory, and to invoke data stored in the memory to perform various functions of the electronic device and process data, thereby monitoring the electronic device as a whole. In at least one implementation, the AP may be just an AP; alternatively, the AP may also integrate a modem processor, where the AP is mainly configured to handle an operating system, an user interface, applications, and so on, and the modem processor is mainly configured to handle wireless communication. It should be understood that the above-mentioned modem processor may also not be integrated into the processor.

The memory is configured to store software programs and modules, and the AP is configured to execute various function applications and data processing of the electronic device by running the software programs and modules stored in the memory. The memory may include a program storage area and a data storage area. The program storage area may store an operating system, application programs required for at least one function and so on. The data storage area may store data created according to use of the electronic device, and so on. In addition, the memory may include a high-speed random access memory (RAM), and may further include a non-volatile memory such as at least one disk storage device, a flash device, or other non-volatile solid storage devices.

In one implementation, the second region 142 may include a single plate region (that is, in one implementation, there can be only one second region 142. In another implementation, there can be more than one second regions 142, which is not described here), and the single plate region may partially overlap a side edge of the cover plate 140.

In one implementation, at least one function assembly 160 may be disposed at a position on the circuit 120 corresponding to the second region 142, and the circuit 170 may be coupled with the at least one functional assembly 160.

In addition, the at least one functional assembly 160 may include at least one of a front camera, a face recognition device, a proximity sensor, an ambient light sensor, etc.

In one implementation, the special-shaped display 150 may include a touch screen and a display screen, and the display screen may include an organic light-emitting diode (OLED) display screen.

Figure 1B:
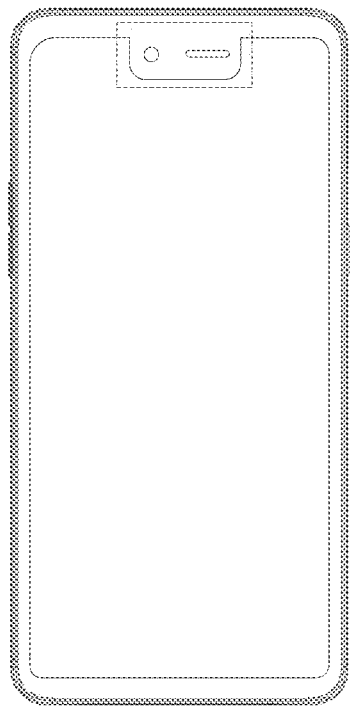
FIG. 1B is a schematic presentation diagram illustrating an electronic device according to implementations of the present disclosure.

Further, as illustrated in FIG. 1B, it can be seen that some regions disposed on an upper end of the special-shaped screen, that is, an incomplete region corresponding to the special-shaped screen (represented by a dashed box in FIG. 1B, and corresponding to the second region 142 in FIG. 1A), cannot display contents. Since the incomplete region is configured to accommodate some sensors (such as a camera(s), a microphone, etc.), the incomplete region does not belong to a display region of the special-shaped screen and cannot be used for display. Therefore, a bangs-style display screen is presented.

Figure 1C:
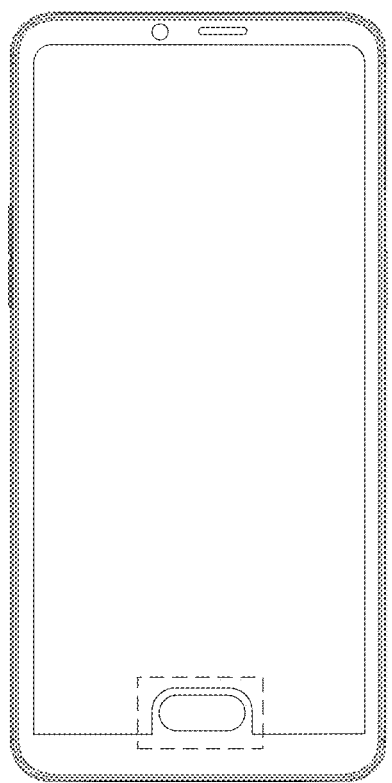
FIG. 1C is a schematic presentation diagram illustrating an electronic device according to implementations of the present disclosure.

Furthermore, FIG. 1C illustrates a variation structure of the electronic device 100 illustrated in FIG. 1A, which further includes a home key (i.e., a key in a dashed box in FIG. 1C). Therefore, the special-shaped screen in FIG. 1C is also presented as bangs-style. It can be seen that, some regions disposed on a lower end of the special-shaped screen, that is, an incomplete region in the special-shaped screen, cannot display contents. Since the incomplete region is configured to accommodate some sensors (such as the above-mentioned home key), the incomplete region does not belong to a display region of the special-shaped screen and cannot be used for display, and, a bangs-style display screen is presented.

Of course, the incomplete region corresponding to the special-shaped screen can not only be disposed on upper or lower ends thereof, but can also be disposed on left or right sides thereof, or even be disposed at a corner thereof. In addition, the incomplete region may also be embodied as multiple regions. The special-shaped screen corresponds to the incomplete region, which cannot be used to display contents due to some sensors disposed therein. Therefore, when taking a screenshot on the special-shaped screen, a screenshot image in a special shape will be obtained. Thus, on the one hand, it does not conform the conventional aesthetics, and on the other hand, since the incomplete region cannot display contents, this causes corresponding contents that should be originally displayed to be missing, resulting in incomplete display contents, thereby degrading user experience.

The electronic device described based on FIGS. 1A to 1C can be used to implement the following functions.

The special-shaped screen 150 is configured to display a preset interface in the special-shaped region and the regular-shaped region.

The circuit 170 is configured to obtain a first screenshot of the preset interface in a first screen status, to obtain a second screenshot by inversing the preset interface and performing a screenshot on the preset interface inversed in a second screen status, and to obtain a synthesized screenshot by synthesizing the first screenshot and the second screenshot, where the synthesized screenshot is a complete screenshot.

The special-shaped screen 150 includes the special-shaped region 151 and the regular-shaped region 152, that is, the special-shaped region 151 and the regular-shaped region 152 have the same function. The special-shaped screen 150 may be a touch display screen, that is, the special-shaped screen 150 may be configured to detect touch operations, and to display contents either.

In one implementation of the present disclosure, the special-shaped screen 150 is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with the special-shaped screen 150. The special-shaped screen 150 includes a special-shaped region and a regular-shaped region. The circuit board is provided with a circuit 170 coupled with the special-shaped screen. The special-shaped screen 150 is configured to display a preset interface in the special-shaped region and the regular-shaped region. The circuit 170 is configured to obtain a first screenshot of the preset interface in a first screen status, to obtain a second screenshot by inversing the preset interface and performing a screenshot on the preset interface inversed in a second state, and to obtain a synthesized screenshot by synthesizing the first screenshot and the second screenshot, where the synthesized screenshot is a complete screenshot. As such, a screenshot with an incomplete region as well as a screenshot with an image corresponding to the incomplete region may be obtained, and the complete screenshot may then be obtained by synthesizing the above-identified two screenshots.

In one implementation, the circuit 170 configured to obtain a synthesized screenshot by synthesizing the first screenshot and the second screenshot is configured to perform the following.

The circuit 170 is configured to determine an incomplete region in the first screenshot (that is, an incomplete region corresponding to the first screenshot, represented by a dashed box in FIG. 1B, and corresponding to the second region 142 in FIG. 1A), to obtain a third screenshot (as one implementation, the third screenshot can be an image I) by inversing the second screenshot, where the third screenshot is in a same orientation as the first screenshot, to obtain a target image corresponding to the incomplete region from the third screenshot by cropping the third screenshot, and to obtain the synthesized screenshot by stitching the first screenshot and the target image.

In one implementation, the circuit 170 configured to obtain a synthesized screenshot by synthesizing the first screenshot and the second screenshot is configured to perform the following.

The circuit 170 is configured to obtain a third screenshot (as one implementation, the third screenshot can be an image II) by inversing the second screenshot, and to obtain the synthesized screenshot by superimposing the first screenshot and the third screenshot.

In one implementation, the circuit 170 configured to superimpose the first screenshot and the third screenshot is configured to perform the following.

The circuit 170 is configured to determine a weight a1 of the incomplete region and a weight b1 of a complete region, in the first screenshot, where the weight a1 and the weight b1 range from 0 to 1, to determine a weight a2 of a symmetric region of the incomplete region and a weight b2 of a dissymmetric region, in an incomplete region in the third screenshot, where the weight a2 and the weight b2 range from 0 to 1, and to perform a weighting operation on the first screenshot and the third screenshot according to the weight a1, the weight b1, the weight a2, and the weight b2.

In this implementation, the complete region corresponds to the first region 141 in FIG. 1A, in other words, the complete region corresponds to the special-shaped screen 150 (that is, the special-shaped region 151 and the regular-shaped region 152).

In this implementation, the third screenshot can include a dissymmetric region and a symmetric region. The symmetric region is a mirror region of the incomplete region in the third screenshot. The symmetric region may be found by setting a symmetry axis in the third screenshot. The dissymmetric region is a region other than the symmetric region in the third screenshot.

In one implementation, the circuit 170 is further configured to perform the following.

A determination may be made whether the incomplete region of the first screenshot includes preset contents. The circuit 170 is configured to obtain a second screenshot, by inversing the preset interface and performing a screenshot on the preset interface inversed based on a determination that the incomplete region of the first screenshot includes the preset contents.

Based on the electronic device illustrated in FIGS. 1A to 1C, FIG. 1D is a flow chart illustrating a method for screenshot according to the implementations of the present disclosure. The method for screenshot can be applicable to an electronic device illustrated in FIGS. 1A to 1C. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region, and the circuit board is provided with a circuit coupled with the special-shaped screen. The method for screenshot, illustrated in the implementations of the present disclosure, begins at block 101.

At block 101, a preset interface is displayed in the special-shaped region and the regular-shaped region of the special-shaped screen, and a first screenshot of the preset interface in a first screen status may be obtained.

In this implementation, the preset interface is an original displayed data information to be screenshot, in other words, the preset interface is a complete interface originally. There is an incomplete region in the first screenshot because of a non-display region of the terminal device (that is the second region 142 in FIG. 1A).

Figure 1D:
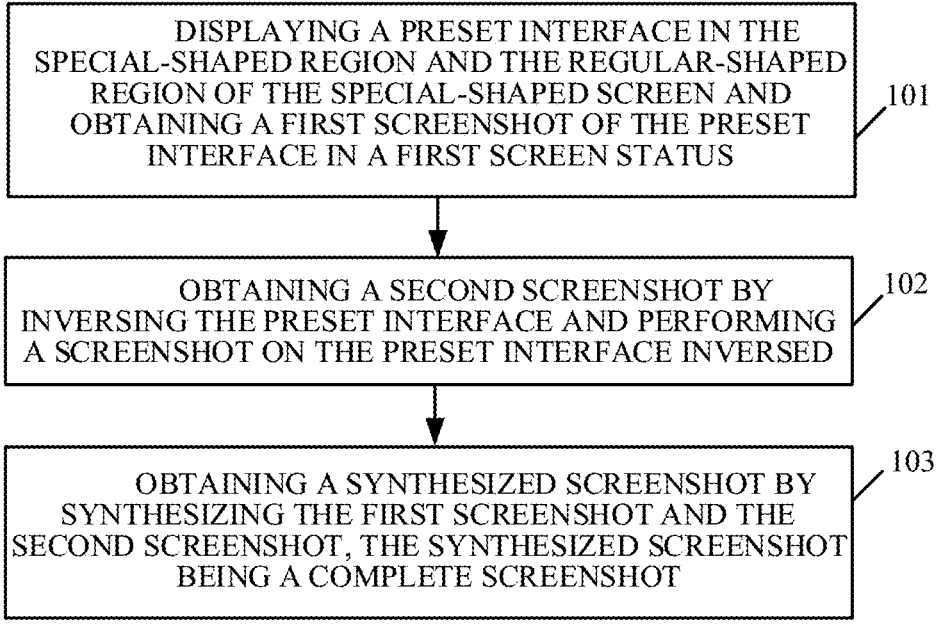
FIG. 1D is a flow chart illustrating a method for screenshot according to implementations of the present disclosure.
Figure 1E:
FIG. 1E is a schematic presentation diagram illustrating an interface of an electronic device according to implementations of the present disclosure.
Figure 1F:
FIG. 1F is a schematic presentation diagram illustrating an interface of an electronic device according to implementations of the present disclosure.

The first screen status refers to a status of the preset interface. The first screen status may be one of the following: a portrait mode-upright status (that is, an upright status of an displayed interface when the electronic device positioned in the portrait orientation), a portrait mode-inverted status (that is, an inverted status of the displayed interface when the electronic device positioned in the portrait orientation), a landscape mode-upright status (that is, an upright status of the displayed interface when the electronic device positioned in the landscape orientation), and a landscape mode-inverted status (that is, an inverted status of the displayed interface when the electronic device positioned in the landscape orientation). The above-mentioned preset interface may be an interface to-be-screenshot, which can be specified by users. The preset interface may be any interface displayed in the special-shaped screen. For example, the first screenshot of the preset interface in the first screen status may be obtained when a screenshot instruction is received. As illustrated in FIGS. 1E and 1F, FIG. 1E is in the portrait mode-upright status, FIG. 1F is in the portrait mode-inverted status. FIG. 1J is in the landscape mode-upright status, FIG. 1K is in the landscape mode-inverted status.

At block 102, a second screenshot may be obtained, by inversing the preset interface (that is, rotating the preset interface 180 degrees about an axis perpendicular to the special-shaped screen) and performing a screenshot on the preset interface inversed.

The preset interface may enter a second screen status by inversing the preset interface. The above-mentioned second screen status may be one of the following: the portrait mode-upright status, the portrait mode-inverted status, the landscape mode-upright status, and the landscape mode-inverted status. It should be understood that, the preset interface in the first screen status and the preset interface in the second screen status are orientation-inverted with respect to each other. For example, the preset interface in the portrait mode-upright status and the preset interface in the portrait mode-inverted status are orientation-inverted with respect to each other, and the preset interface in the landscape mode-upright status and the preset interface in the landscape mode-inverted status are orientation-inverted with respect to each other. Specifically, the first screen status may be the portrait mode-upright status, and then the second screen status may be the portrait mode-inverted status. Alternatively, the first screen status may be the landscape mode-upright status, and then the second screen status may be the landscape mode-inverted status.

Alternatively, the circuit 170 (i.e., a driving circuit for the special-shaped screen) of the electronic device is configured to obtain the second screen status by driving the special-shaped screen to perform an orientation-inverting operation of the preset interface. The second screen status and the first screen status are orientation-inverted with respect to each other, a screenshot of the preset interface in the second screen status (i.e., the second screenshot) may be obtained. Of course, in order to obtain a better user experience, the orientation-inverting operation of the screen and a process of obtaining the second screenshot of the preset interface in the second screen status may be implemented in the background. As such, there is only one screenshot process will be presented to the users, and the screenshot obtained through the only one screenshot process viewed by the users is complete either.

At block 103, a synthesized screenshot may be obtained by synthesizing the first screenshot and the second screenshot, where the synthesized screenshot is a complete screenshot.

The following describes a model of the electronic device illustrated in FIG. 1A as an example, which includes an incomplete region, and therefore, the first screenshot includes a corresponding incomplete region, and the second screenshot also includes another corresponding incomplete region. However, the first screenshot and the second screenshot are orientation-inverted with respect to each other, such that the two incomplete regions are complete offset from each other. Based on the above-mentioned scenario, a display image missing from the corresponding incomplete region in the first screenshot is available in the second screenshot.

Figure 1G:
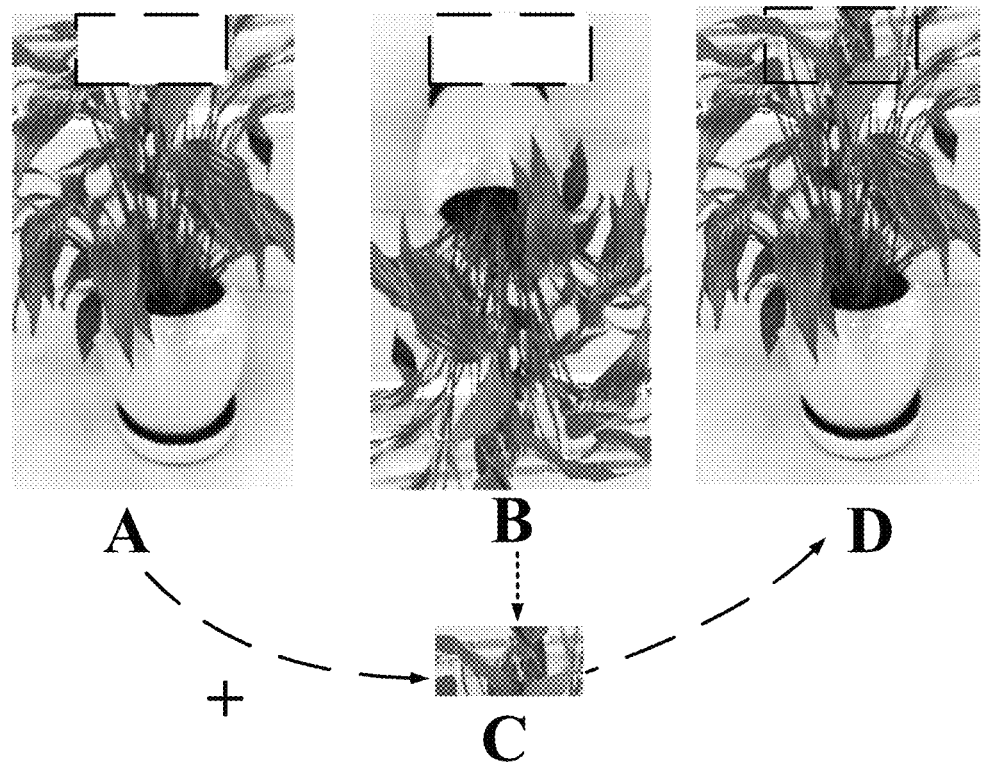
FIG. 1G is a schematic presentation diagram illustrating an interface of an electronic device according to implementations of the present disclosure.

Referring to FIG. 1G, A represents an image in the first screen status, and a dashed box in A represents an incomplete region. B represents an image in the second screen status (A and B respectively illustrate two screenshots of a same preset image in two screen statuses, and A and B are two images orientation-inverted with respect to each other), and a dashed box in B represents an incomplete region. It can be seen that the display images missing from the incomplete regions of A and B are different with each other. Specifically, C represents an image of the corresponding incomplete region in A, while C is available in B, and then A and C may be synthesized together to obtain D, which is a final complete image. According to the above analysis, the synthesized screenshot may be obtained by synthesizing the first screenshot and the second screenshot, and the synthesized screenshot is a complete screenshot.

Of course, according to the above analysis, at block 103, the screenshot and the second screenshot may also be synthesized as following two manners. One is corresponding to following operations at A1 to A4, and the other is corresponding to following operations at B1 and B2.

Alternatively, at block 103, the synthesized screenshot may be obtained by synthesizing the first screenshot and the second screenshot as follows.

At A1, an incomplete region in the first screenshot may be determined.

At A2, a third screenshot (as one implementation, the third screenshot can be image I) may be obtained by inversing the second screenshot, where the third screenshot is in a same orientation as the first screenshot.

At A3, a target image corresponding to the incomplete region may be obtained from the third screenshot by cropping the third screenshot.

At A4, the synthesized screenshot may obtained by stitching the first screenshot and the target image.

As described above, the special-shaped screen includes an incomplete region, and then the first screenshot includes an incomplete region. Since the first screenshot and the second screenshot are orientation-inverted with respect to each other, and therefore, the second screenshot may subjected to the orientation-inverting operation (that is, the second screenshot may be orientation-inverted). Thus, when the first screenshot and the third screenshot are superimposed with each other, the third screenshot is capable of completely filling the incomplete region in the first screenshot. Specifically, referring to FIG. 1G, when B has been orientation-inverted into an image illustrated in FIG. 1H, in a superimposition process of A and B, B inverted is capable of completely filling the incomplete region in A, and an image of the incomplete region in A is exactly displayed by C, where C may be achieved at A3. Further, at A4, D (that is, the final complete image) may be obtained by stitching A and C.

Alternatively, at A3, a synthesized screenshot obtained by synthesizing the first screenshot and the second screenshot may be performed as follows.

At B1, a third screenshot (as one implementation, the third screenshot can be image II) may be obtained by inversing the second screenshot.

At B2, the synthesized screenshot may be obtained by superimposing the first screenshot and the third screenshot.

Referring now to FIG. 1G, the third screenshot (referring to FIG. 1H) may be obtained by orientation-inverting the second screenshot illustrated as B. In this manner, the synthesized screenshot may be obtained merely by performing a weighting operation on A and FIG. 1H.

Alternatively, at B2, the first screenshot and the third screenshot may be superimposed as follows.

At B21, in the first screenshot, a weight a1 of the incomplete region and a weight b1 of a complete region may be determined, where the weight a1 and the weight b1 range from 0 to 1.

At B22, in an incomplete region in the third screenshot, a weight a2 of a symmetric region and a weight b2 of a dissymmetric region may be determined, where the weight a2 and the weight b2 range from 0 to 1.

At B23, a weighting operation may performed on the first screenshot and the third screenshot according to the weight a1, the weight b1, the weight a2, and the weight b2.

Figure 1H:
FIG. 1H is a schematic presentation diagram illustrating an interface of an electronic device according to implementations of the present disclosure.
Figure 1I:
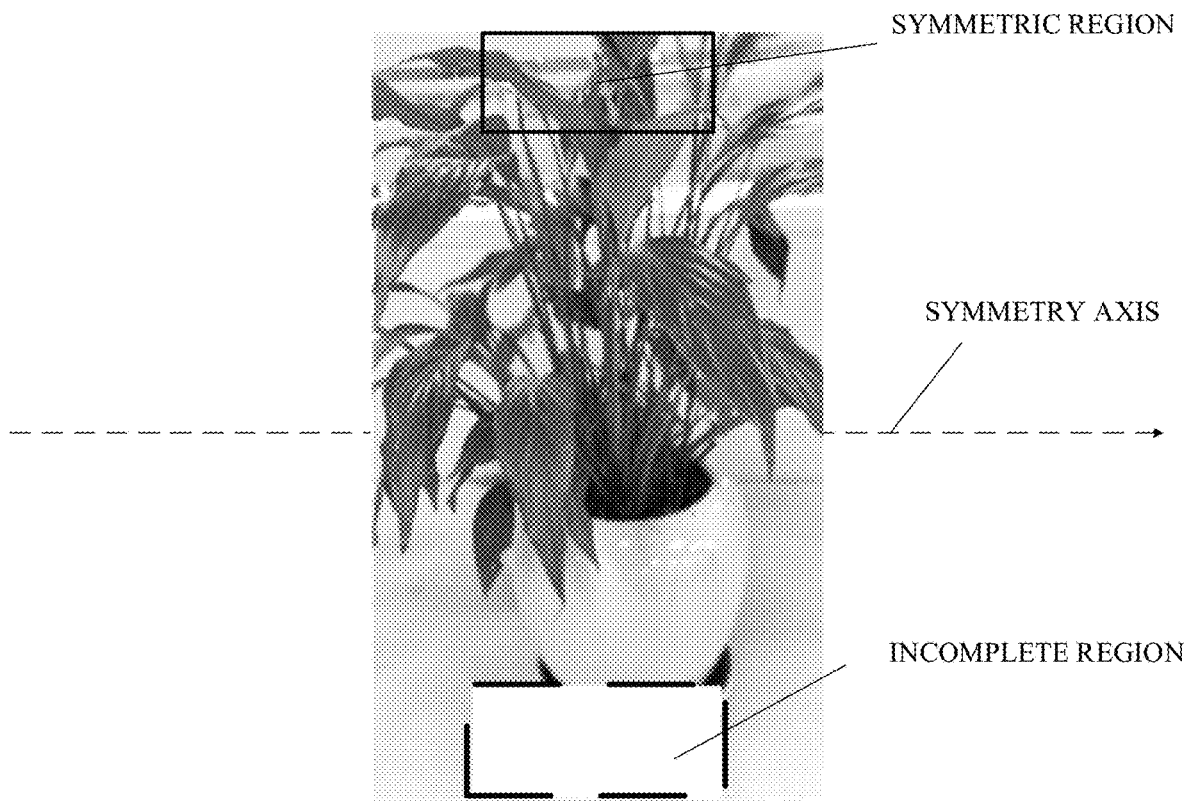
FIG. 1I is a schematic presentation diagram illustrating an interface of an electronic device according to implementations of the present disclosure.
Figure 1J:
FIG. 1J is a schematic presentation diagram illustrating an interface of an electronic device according to implementations of the present disclosure.
Figure 1K:
FIG. 1K is a schematic presentation diagram illustrating an interface of an electronic device according to implementations of the present disclosure.

The above-identified weight a1 and b1 range from 0 to 1, and the above-identified weight a2 and b2 range from 0 to 1. As illustrated in FIG. 1G and FIG. 1H, a weight of the incomplete region in A of FIG. 1G may be set to 0, a weight of the complete region in A of FIG. 1G may be set to 1, and the image of B inverted is illustrated in FIG. 1H. Referring to FIG. 1I, which is corresponding to FIG. 1H, and FIG. 1H includes an incomplete region. A symmetric region may be found by setting a symmetry axis. A weight of the symmetric region corresponding to the incomplete region in A may be set to 1, and a weight of other regions may be set to 0. It should be noted that, as for a method for setting weights, other methods may be referring to, and details are not described herein again.

It should be understood that, in the process of performing the above-identified operations at B1 and B2, an operation of filling pixel may be performed at B1 and B2, that is, pixel values corresponding to the incomplete regions at both B1 and B2 may be set to 0.

Moreover, after the above-identified operations at block 103 are completed, the synthesized screenshot may also be displayed. Alternatively, the synthesized screenshot may be saved.

In one implementation of the present disclosure, the method for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The special-shaped screen is configured to display a preset interface in the special-shaped region and the regular-shaped region. The circuit 170 is configured to perform the following. A first screenshot of the preset interface in a first screen status is obtained. A second screenshot is obtained, by inversing the preset interface and performing a screenshot on the preset interface inversed in a second screen status. A synthesized screenshot is obtained by synthesizing the first screenshot and the second screenshot, where the synthesized screenshot is a complete screenshot. As such, a screenshot with an incomplete region as well as a screenshot with an image corresponding to the incomplete region may be obtained, and the complete screenshot may then be obtained by synthesizing the above-identified two screenshots.

Figure 2:
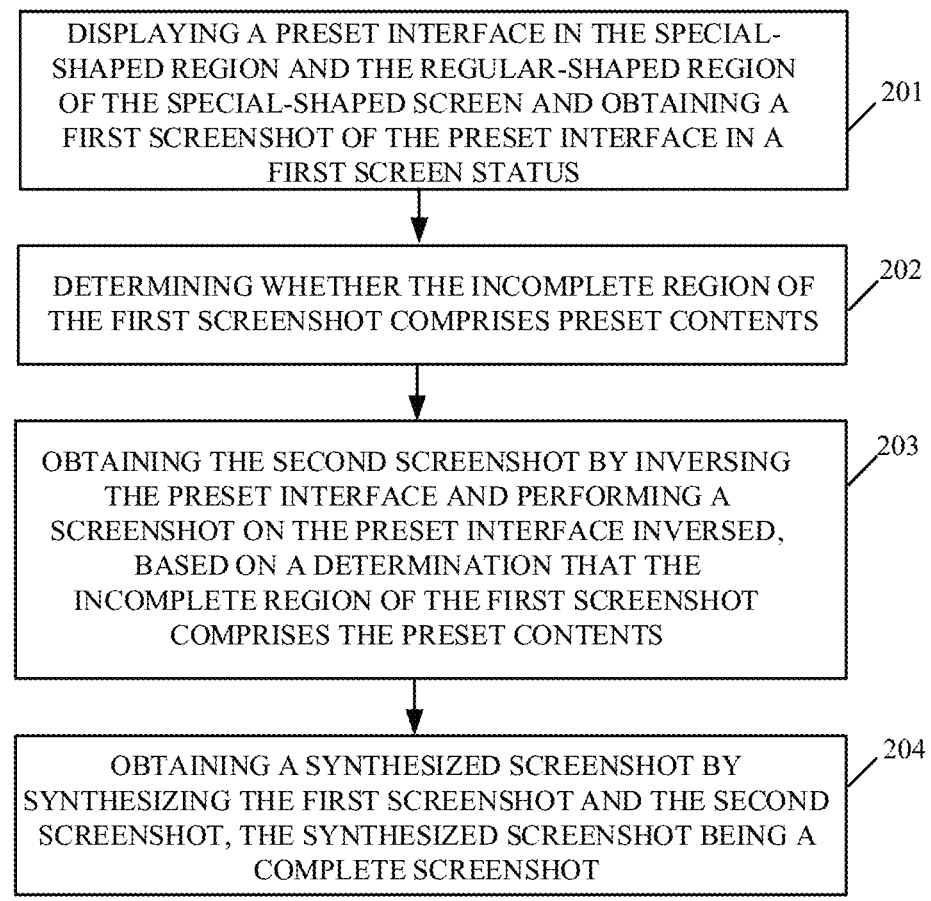
FIG. 2 is a flow chart illustrating another method for screenshot according to implementations of the present disclosure.

Accordingly, FIG. 2 is a flow chart illustrating a method for screenshot according to implementations of the present disclosure. The method for screenshot illustrated in the implementations of the present disclosure may include the following.

At block 201, a first screenshot of the preset interface in a first screen status may be obtained.

At block 202, a determination may be made whether the incomplete region of the first screenshot includes the preset contents.

The above-mentioned present contents may be perceived as contents which have not been displayed completely, such as characters, images, controls, and the like. The present contents which have not been displayed completely may be an essential part of the preset interface. For example, when a portion of a self-photograph is displayed incompletely, the method for screenshot may advance to block 203 based on a determination that the incomplete region of the first screenshot includes the preset contents (in an implementation, the preset contents can be the user's face). The method for screenshot may not advance to block 203 based on a determination that the incomplete region of the first screenshot does not include the preset contents.

As an implementation, in the process of performing the above-mentioned block 202, the determination whether the incomplete region of the first screenshot includes the preset contents may be made by employing a manner of semantic analysis or image integrity detection. For example, when the incomplete region is supposed to display a sentence, such as "OPPO R11S® photographing mobile phone", however, since the incomplete region is not capable of displaying contents, such that the sentence is displayed as "OPPO® photographing mobile phone", and thus, the above-identified determination may be made by the manner of semantic analysis. For another example, when a screenshot is supposed to include an image, the above-identified determination may be made by the manner of image integrity detection, such as, detecting edges of the image, detecting whether there exists sharp transitions between adjacent positions (i.e., a large difference of changes), or detecting whether the target is complete, etc.

At block 203, a second screenshot may be obtained, by inversing the preset interface and performing a screenshot on the preset interface inversed, based on determination that the incomplete region includes the preset contents.

At block 204, a synthesized screenshot may be obtained by synthesizing the first screenshot and the second screenshot, where the synthesized screenshot is a complete screenshot.

The above-identified block 201 and blocks 203 to 204 may be described with reference to corresponding blocks of the method for screenshot illustrated in FIG. 1D, which are not described herein again.

In one implementation of the present disclosure, the method for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The special-shaped screen is configured to display a preset interface in the special-shaped region and the regular-shaped region. The circuit 170 is configured to perform the following. A first screenshot of the preset interface in a first screen status is obtained. A second screenshot is obtained, by inversing the preset interface and performing a screenshot on the preset interface inversed in a second screen status. A synthesized screenshot is obtained by synthesizing the first screenshot and the second screenshot, where the synthesized screenshot is a complete screenshot. As such, a screenshot with an incomplete region as well as a screenshot with an image corresponding to the incomplete region may be obtained, and the complete screenshot may then be obtained by synthesizing the above-identified two screenshots.

Figure 3:
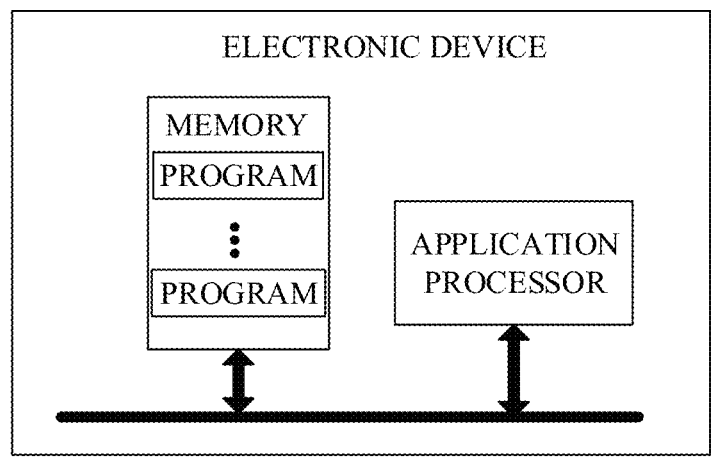
FIG. 3 is another schematic structure diagram illustrating an electronic device according to implementations of the present disclosure.

FIG. 3 is a schematic structure diagram illustrating an electronic device according to implementations of the present disclosure. The electronic device includes an application processor (AP) and a memory configured to store one or more programs. The one or more programs are configured to be executed by the processor, and includes instructions operable to execute the following operations.

A preset interface is displayed in the special-shaped region and the regular-shaped region, and a first screenshot of the preset interface in a first screen status is obtained. A second screenshot is obtained by inversing the preset interface and performing a screenshot on the preset interface inversed. A synthesized screenshot is obtained by synthesizing the first screenshot and the second screenshot, where the synthesized screenshot is a complete screenshot.

In one implementation, in terms of obtaining a synthesized screenshot by synthesizing the first screenshot and the second screenshot, the one or more programs include instructions operable to execute the following operations.

The programs determine an incomplete region in the first screenshot. The programs obtain a third screenshot by inversing the second screenshot, where the third screenshot is in a same orientation as the first screenshot. The programs obtain a target image corresponding to the incomplete region, from the third screenshot, by cropping the third screenshot. The programs obtain the synthesized screenshot by stitching the first screenshot and the target image.

In one implementation, in terms of obtaining a synthesized screenshot by synthesizing the first screenshot and the second screenshot, the one or more programs include instructions operable to execute the following operations.

The programs obtain a third screenshot by inversing the second screenshot. The programs obtain the synthesized screenshot by superimposing the first screenshot and the third screenshot.

In one implementation, in terms of superimposing the first screenshot and the third screenshot, the one or more programs include instructions operable to execute the following operations.

In the first screenshot, the programs determine a weight a1 of the incomplete region and a weight b1 of a complete region, where the weight a1 and the weight b1 range from 0 to 1. In an incomplete region in the third screenshot, the programs determine a weight a2 of a symmetric region and a weight b2 of a dissymmetric region, where the weight a2 and the weight b2 range from 0 to 1. The programs determine perform a weighting operation on the first screenshot and the third screenshot according to the weight a1, the weight b1, the weight a2, and the weight b2.

In one implementation, the one or more programs further include instructions operable to execute the following operations.

A determination may be made whether the incomplete region of the first screenshot includes preset contents. The second screenshot may be obtained, by inversing the preset interface and performing a screenshot on the preset interface inversed, based on a determination that the incomplete region of the first screenshot includes the preset contents.

A device for implementing the above-mentioned method for screenshot is provided as follows.

Figure 4A:
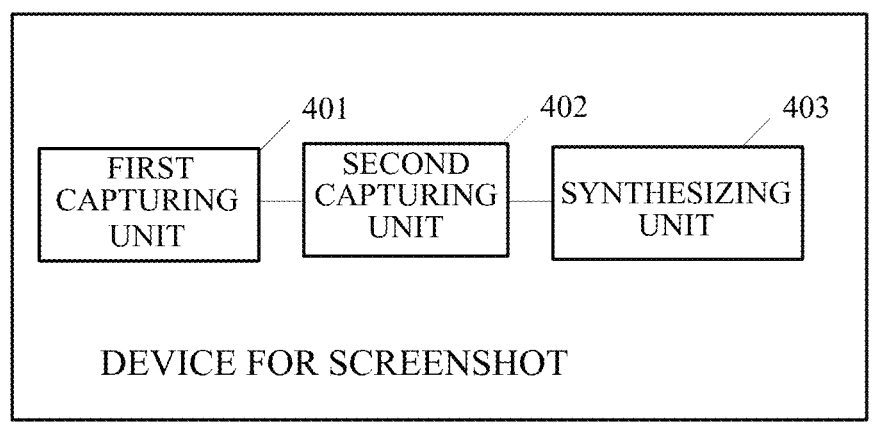
FIG. 4A is a schematic structure diagram illustrating a device for screenshot according to implementations of the present disclosure.

FIG. 4A is a schematic structure diagram illustrating a device for screenshot according to implementations of the present disclosure. The device for screenshot is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The device for screenshot includes a first capturing unit 401, a second capturing unit 402, and a synthesizing unit 403.

The first capturing unit 401 is configured to display a preset interface in the special-shaped region and the regular-shaped region of the special-shaped screen and to obtain a first screenshot of the preset interface in a first screen status.

The second capturing unit 402 is configured to obtain a second screenshot by inversing the preset interface and performing a screenshot on the preset interface inversed.

The synthesizing unit 403 is configured to obtain a synthesized screenshot by synthesizing the first screenshot and the second screenshot, where the synthesized screenshot is a complete screenshot.

Figure 4B:
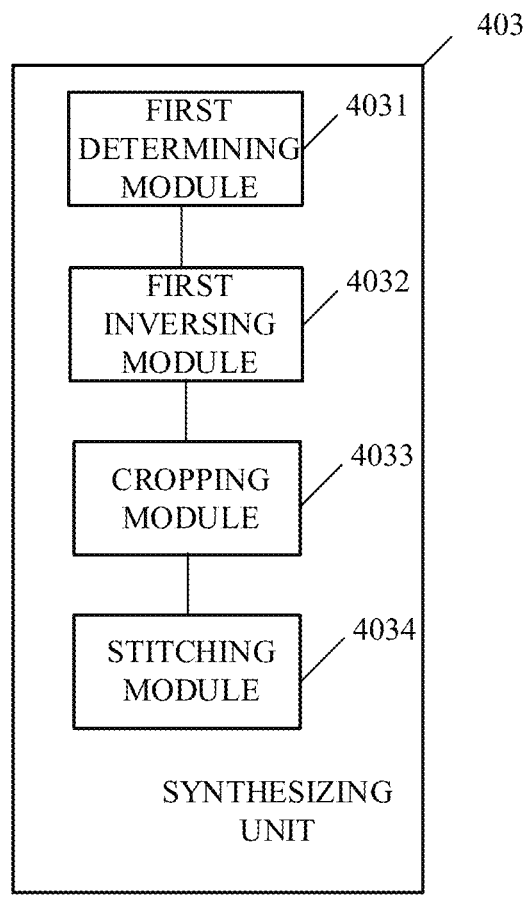
FIG. 4B is a schematic structure diagram illustrating a synthesizing unit of the device for screenshot illustrated in FIG. 4A according to implementations of the present disclosure.

FIG. 4B is a schematic detail structure diagram illustrating the synthesizing unit 403 of the device for screenshot illustrated in FIG. 4A according to implementations of the present disclosure. The synthesizing unit 403 may include a first determining module 4031, a first inversing module 4032, a cropping module 4033, and a stitching module 4034.

The first determining module 4031 is configured to determine an incomplete region in the first screenshot.

The first inversing module 4032 is configured to obtain a third screenshot by inversing the second screenshot, where the third screenshot is in a same orientation as the first screenshot.

The cropping module 4033 is configured to obtain a target image corresponding to the incomplete region from the third screenshot by cropping the third screenshot.

The stitching module 4034 is configured to obtain the synthesized screenshot by stitching the first screenshot and the target image.

Figure 4C:
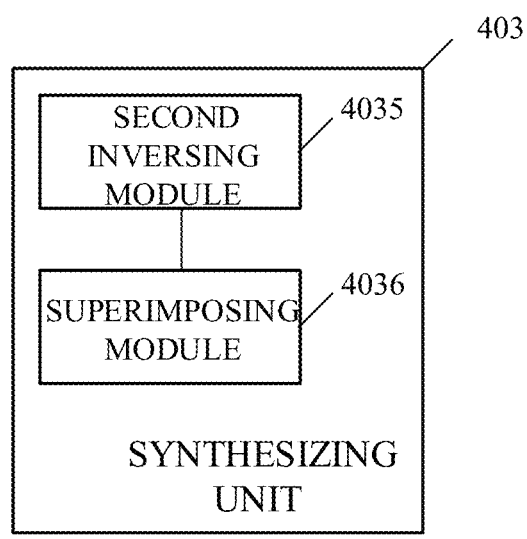
FIG. 4C is another schematic structure diagram illustrating a synthesizing unit of the device for screenshot illustrated in FIG. 4A according to implementations of the present disclosure.

FIG. 4C is another schematic detail structure diagram illustrating the synthesizing unit 403 of the device for screenshot illustrated in FIG. 4A according to implementations of the present disclosure. The synthesizing unit 403 may include a second inversing module 4035 and a superimposing module 4036.

The second inversing module 4035 is configured to obtain a third screenshot by inversing the second screenshot.

The superimposing module 4036 is configured to obtain the synthesized screenshot by superimposing the first screenshot and the third screenshot.

Figure 4D:
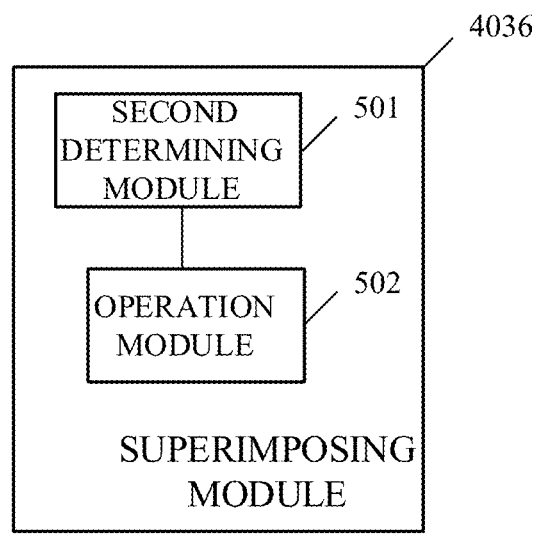
FIG. 4D is a schematic structure diagram illustrating a superimposing module of the synthesizing unit illustrated in FIG. 4C according to implementations of the present disclosure.

FIG. 4D is yet another schematic structure diagram illustrating a superimposing module 4036 of the synthesizing unit 403 illustrated in FIG. 4C according to implementations of the present disclosure. The superimposing module 4036 may include a second determining module 501 and an operation module 502.

The second determining module 501 is configured to determine, in the first screenshot, a weight a1 of the incomplete region and a weight b1 of a complete region, where the weight a1 and the weight b1 range from 0 to 1. The second determining module 501 is also configured to determine, in an incomplete region in the third screenshot, a weight a2 of a symmetric region and a weight b2 of a dissymmetric region, where the weight a2 and the weight b2 range from 0 to 1.

The operation module 502 is configured to perform a weighting operation on the first screenshot and the third screenshot according to the weight a1, the weight b1, the weight a2, and the weight b2.

Figure 4E:
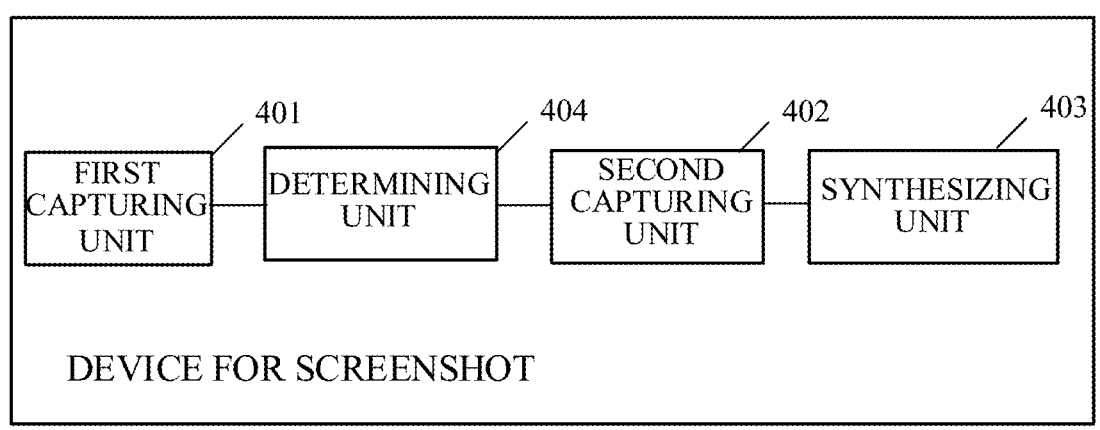
FIG. 4E is another schematic structure diagram of the device for screenshot illustrated in FIG. 4A according to implementations of the present disclosure.

FIG. 4E illustrates a variant structure of the device for screenshot illustrated in FIG. 4A. Compared with FIG. 4A, a determining unit 404 may be further provided.

The determining unit 404 is configured to determine whether the incomplete region of the first screenshot includes preset contents. The second capturing unit 402 is configured to obtain the second screenshot, by inversing the preset interface and performing a screenshot on the preset interface inversed, based on a determination that the incomplete region of the first screenshot includes the preset contents.

It can be seen that, the device for screenshot illustrated in the implementations of the present disclosure is applicable to an electronic device. The electronic device includes a housing, a circuit board, a battery, and a cover plate. The circuit board, the battery, and the cover plate are disposed on the housing. The cover plate includes a first region and a second region other than the first region. An inner surface of the first region is provided with a special-shaped screen. The special-shaped screen includes a special-shaped region and a regular-shaped region. The circuit board is provided with a circuit coupled with the special-shaped screen. The special-shaped screen is configured to display a preset interface in the special-shaped region and the regular-shaped region. The circuit 170 is configured to obtain a first screenshot of the preset interface in a first screen status, to obtain a second screenshot by inversing the preset interface and performing a screenshot on the preset interface inversed, and to obtain a synthesized screenshot by synthesizing the first screenshot and the second screenshot, where the synthesized screenshot is a complete screenshot. As such, a screenshot with an incomplete region as well as a screenshot with an image corresponding to the incomplete region may be obtained, and the complete screenshot may then be obtained by synthesizing the above-identified two screenshots.

It should be understood that the functions of the program modules of the device for screenshot in this implementation may be specifically implemented according to the method for screenshot in the foregoing method implementations. For a specific implementation process thereof, reference may be made to the related description of the foregoing method implementations, and details are not described herein again.

In this implementation, the device for screenshot is presented in the form of modules. The "module" herein may refer to an application-specific integrated circuit (ASIC), a processor and a memory that can execute one or more software or firmware programs, an integrated logic circuit, and/or other components that can achieve the above-described functions. In addition, the above-identified units or modules are implemented by the AP of the electronic device illustrated in FIG. 3.

Figure 5:
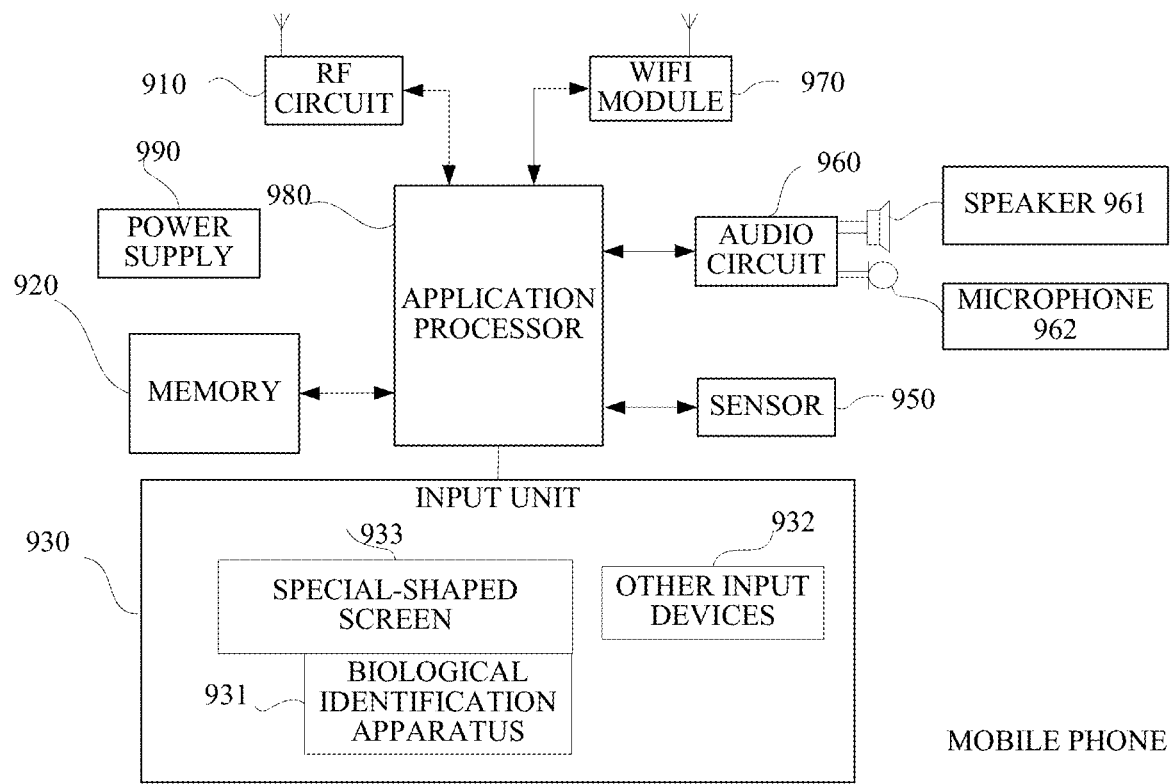
FIG. 5 is a schematic structure diagram illustrating another electronic device according to implementations of the present disclosure.

The implementations of the present disclosure also provide another electronic device, as shown in FIG. 5. For the convenience of description, only parts related to the implementations of the present application are shown. Specific technical details are not disclosed, please refer to the method implementations of the present disclosure. The electronic device may be any terminal device such as a mobile phone, a tablet computer, a personal digital assistant (PDA), a point of sales (POS), an in-vehicle computer, and the like. The following describes a mobile phone as an example of the electronic device.

FIG. 5 is a block diagram of a part of a structure of a mobile phone related to an electronic device according to an implementation of the disclosure. Referring to FIG. 5, the mobile phone includes a radio frequency (RF) circuit 910, a memory 920, an input unit 930, a sensor 950, an audio circuit 960, a wireless fidelity (Wi-Fi) module 970, an application processor (AP) 980, and a power supply 990 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 5.

The input unit 930 may be configured to receive input digital or character information and generate key signal input associated with user setting and function control of the mobile phone. As one implementation, the input unit 930 may include a special-shaped screen 933, a biological identification apparatus 931 and other input devices 932. The special-shaped screen 933 may include a special-shaped region and a regular-shaped region. The biological identification apparatus 931 may refer to the above-mentioned structure, and a specific structure thereof may be composed with reference to the above description, and details are not described herein. The input unit 930 may further include the other input devices 932. As one implementation, the other input devices 932 may include, but not limit to, one or more of a physical keyboard, a function key (such as a volume control key, a switch key, etc.), a trackball, a mouse, a joystick and the like.

The AP 980 is configured to perform the following operations. A preset interface is displayed in the special-shaped region and the regular-shaped region. A first screenshot of the preset interface in a first screen status may be obtained. A second screenshot may be obtained, by inversing the preset interface and performing a screenshot on the preset interface inversed. A synthesized screenshot may be obtained by synthesizing the first screenshot and the second screenshot, where the synthesized screenshot is a complete screenshot.

The AP 980 is a control center of the mobile phone and connects various parts of the entire mobile phone through various interfaces and lines. By running or executing software programs and/or modules stored in the memory 920 and invoking data stored in the memory 920, the AP 980 can execute various functions of the mobile phone and conduct data processing, so as to monitor the mobile phone as a whole. The AP 980 may include one or more processing units. The AP 980 may be integrated with an AP (such as, a CPU or GPU) and a modem processor, where the AP is mainly configured to handle an operating system, a user interface, applications, and so on. The modem processor is mainly configured to deal with wireless communication. It will be appreciated that the modem processor mentioned above may not be integrated into the AP 980.

In addition, the memory 920 may include a high-speed RAM, and may further include a non-volatile memory such as at least one disk storage device, a flash device, or other non-volatile solid storage devices.

The RF circuit 910 is configured to receive or transmit information. Generally, the RF circuit 910 includes but is not limited to an antenna, at least one amplifier, a transceiver, a coupler, a low noise amplifier (LNA), a duplexer and the like. In addition, the RF circuit 910 may also communicate with other devices via wireless communication and the network. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The mobile phone may also include at least one sensor 950, such as a light sensor, a motion sensor, and other sensors. As one implementation, the light sensor may include an ambient light sensor and a proximity sensor, among which the ambient light sensor may adjust brightness of the special-shaped screen 933 according to ambient lights. The proximity sensor may turn off the special-shaped screen 933 and/or backlight when the mobile phone reaches nearby the ear. As a kind of the motion sensor, a accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed and transmitted by the AP 980 via the RF circuit 910 to another mobile phone for example, or, the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media and the like. Wi-Fi provides users with wireless broadband Internet access. Although the Wi-Fi module 970 is illustrated in FIG. 5, it should be understood that the Wi-Fi module 970 is not essential to the mobile phone and can be omitted according to actual needs without departing from the essential nature of the present disclosure.

The mobile phone also includes a power supply 990 (e.g., a battery) that supplies power to various components. For instance, the power supply 990 may be logically connected to the AP 980 via a power management system to enable management of charging, discharging, and power consumption through the power management system.

Although not illustrated, the mobile phone may further include a camera, a Bluetooth module, etc., and the disclosure will not elaborate herein.

In the implementations illustrated in the foregoing FIG. 1D or FIG. 2, each operation in the method flow may be implemented based on the structure of the mobile phone.

In the implementations illustrated in the foregoing FIG. 3 and FIGS. 4A to 4E, functions of each unit may be implemented based on the structure of the mobile phone.

Implementations of the present disclosure also provide a non-transitory computer storage medium. The non-transitory computer storage medium stores computer programs for electronic data interchange which, when executed, are operable with a computer to accomplish all or part of the operations of any of the methods described in the above-described method implementation.

Implementations of the present disclosure also provide a computer program product. The computer program product includes a non-transitory computer-readable storage medium storing computer programs. The computer programs are operable with a computer to perform all or part of the operations of any of the method for screenshots described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. An electronic device, comprising a housing, a circuit board, a battery, and a cover plate, the circuit board, the battery, and the cover plate being disposed on the housing; the cover plate comprising a first region and a second region other than the first region, an inner surface of the first region being provided with a special-shaped screen, the special-shaped screen comprising a first incomplete region that does not belong to a display region and cannot display contents, a third region, and a fourth region, and the circuit board being provided with a circuit coupled with the special-shaped screen;

the special-shaped screen being configured to display a preset interface in the third region and the fourth region, wherein the preset interface is an interface to-be-screenshot and is any interface displayed in the special-shaped screen; and the circuit being configured to:
    obtain a first screenshot of the preset interface in a first screen status;
    obtain a second screenshot, by rotating the preset interface 180 degrees about an axis perpendicular to the special-shaped screen and performing a screenshot on the preset interface rotated in a second screen status; and
    obtain a synthesized screenshot by synthesizing the first screenshot and the second screenshot, wherein the synthesized screenshot is a complete screenshot, and the complete screenshot is obtained by synthesizing a screenshot having a second incomplete region and a screenshot having an image corresponding to the second incomplete region.

2. The electronic device of claim 1, wherein the circuit configured to obtain a synthesized screenshot by synthesizing the first screenshot and the second screenshot is configured to:
    determine an incomplete region in the first screenshot;
    obtain a third screenshot by rotating the second screenshot 180 degrees about an axis perpendicular to the special-shaped screen, wherein the third screenshot is in a same orientation as the first screenshot;
    obtain, from the third screenshot, a target image corresponding to the incomplete region of the first screenshot by cropping the third screenshot; and
    obtain the synthesized screenshot by stitching the first screenshot and the target image.

3. The electronic device of claim 1, wherein the circuit configured to obtain a synthesized screenshot by synthesizing the first screenshot and the second screenshot is configured to:
    obtain a third screenshot by rotating the second screenshot 180 degrees about an axis perpendicular to the special-shaped screen; and obtain the synthesized screenshot by superimposing the first screenshot and the third screenshot.

4. The electronic device of claim 3, wherein the circuit configured to superimpose the first screenshot and the third screenshot is configured to:
   determine, in the first screenshot, a weight a1 of the incomplete region of the first screenshot and a weight b1 of a complete region, wherein the weight a1 and the weight b1 range from 0 to 1;
   determine, in an incomplete region in the third screenshot, a weight a2 of a symmetric region and a weight b2 of a dissymmetric region, wherein the weight a2 and the weight b2 range from 0 to 1; and
   perform a weighting operation on the first screenshot and the third screenshot according to the weight a1, the weight b1, the weight a2, and the weight b2.

5. The electronic device of claim 1, wherein the circuit is further configured to:
   determine whether the incomplete region of the first screenshot comprises preset contents; and
   obtain the second screenshot, by rotating the preset interface 180 degrees about an axis perpendicular to the special-shaped screen and performing a screenshot on the preset interface rotated.

6. The electronic device of claim 5, wherein the circuit configured to determine whether the incomplete region of the first screenshot comprises the preset contents is further configured to:
   determine whether the incomplete region of the first screenshot comprises the preset contents by employing a manner of semantic analysis or image integrity detection.

7. The electronic device of claim 1, wherein the circuit is further configured to:
   display the synthesized screenshot.

8. A method for screenshot, being applicable to an electronic device, the electronic device comprising a housing, a circuit board, a battery, and a cover plate, the circuit board, the battery, and the cover plate being disposed on the housing; the cover plate comprising a first region and a second region other than the first region, an inner surface of the first region being provided with a special-shaped screen, the special-shaped screen comprising a first incomplete region that does not belong to a display region and cannot display contents, a third region and a fourth region, and the circuit board being provided with a circuit coupled with the special-shaped screen, the method for screenshot comprising:
   displaying a preset interface in the third region and the fourth region of the special-shaped screen, and obtaining a first screenshot of the preset interface in a first screen status, wherein the preset interface is an interface to-be-screenshot and is any interface displayed in the special-shaped screen;
   obtaining a second screenshot by rotating, by the circuit, the preset interface 180 degrees about an axis perpendicular to the special-shaped screen and performing a screenshot on the preset interface rotated; and
   obtaining a synthesized screenshot by synthesizing the first screenshot and the second screenshot, wherein the synthesized screenshot is a complete screenshot, and the complete screenshot is obtained by synthesizing a screenshot having a second incomplete region and a screenshot having an image corresponding to the second incomplete region.

9. The method of claim 8, wherein obtaining the synthesized screenshot by synthesizing the first screenshot and the second screenshot comprises:
   determining an incomplete region in the first screenshot;
   obtaining a third screenshot by rotating the second screenshot 180 degrees about an axis perpendicular to the special-shaped screen, wherein the third screenshot is in a same orientation as the first screenshot;
   obtaining, from the third screenshot, a target image corresponding to the incomplete region of the first screenshot by cropping the third screenshot; and
   obtaining the synthesized screenshot by stitching the first screenshot and the target image.

10. The method of claim 8, wherein obtaining the synthesized screenshot by synthesizing the first screenshot and the second screenshot comprises:
    obtaining a third screenshot by rotating the second screenshot 180 degrees about an axis perpendicular to the special-shaped screen; and
    obtaining the synthesized screenshot by superimposing the first screenshot and the third screenshot.

11. The method of claim 10, wherein superimposing the first screenshot and the third screenshot comprises:
    determining, in the first screenshot, a weight a1 of the incomplete region of the first screenshot and a weight b1 of a complete region, wherein the weight a1 and the weight b1 range from 0 to 1;
    determining, in an incomplete region in the third screenshot, a weight a2 of a symmetric region and a weight b2 of a dissymmetric region, wherein the weight a2 and the weight b2 range from 0 to 1; and
    performing a weighting operation on the first screenshot and the third screenshot according to the weight a1, the weight b1, the weight a2, and the weight b2.

12. The method of claim 8, further comprising:
    determining whether the incomplete region of the first screenshot comprises preset contents; and
    proceeding to obtain the second screenshot, by rotating the preset interface 180 degrees about an axis perpendicular to the special-shaped screen and performing a screenshot on the preset interface rotated, based on a determination that the incomplete region of the first screenshot comprises the preset contents.

13. The method of claim 12, wherein determining whether the incomplete region of the first screenshot comprises preset contents comprises:
    determining whether the incomplete region of the first screenshot comprises the preset contents by employing a manner of semantic analysis or image integrity detection.

14. The method of claim 8, further comprising:
    displaying the synthesized screenshot after obtaining the synthesized screenshot.

15. The method of claim 8, further comprising:
    detecting whether a screenshot instruction is received; and
    proceeding to the obtaining a first screenshot of the preset interface in a first screen status when detecting that the screenshot instruction is received.

16. A non-transitory computer-readable storage medium storing a computer program which, when executed by a processor, causes the processor to:
    display a preset interface in the third region and the fourth region of a special-shaped screen, the special-shaped screen further comprising a first incomplete region that does not belong to a display region and cannot display contents, and obtain a first screenshot of the preset interface in a first screen status, wherein the preset interface is an interface to-be-screenshot and is any interface displayed in the special-shaped screen;

obtain a second screenshot by rotating the preset interface 180 degrees about an axis perpendicular to the special-shaped screen and perform a screenshot on the preset interface rotated; and obtain a synthesized screenshot by synthesizing the first screenshot and the second screenshot, wherein the synthesized screenshot is a complete screenshot, and the complete screenshot is obtained by synthesizing a screenshot having a second incomplete region and a screenshot having an image corresponding to the second incomplete region.

17. The non-transitory computer-readable storage medium of claim 16, wherein the computer program executed by the processor to obtain the synthesized screenshot by synthesizing the first screenshot and the second screenshot is executed by the processor to:

determine an incomplete region in the first screenshot;

obtain a third screenshot by rotating the second screenshot 180 degrees about an axis perpendicular to the special-shaped screen, wherein the third screenshot is in a same orientation as the first screenshot;

obtain, from the third screenshot, a target image corresponding to the incomplete region of the first screenshot by cropping the third screenshot; and obtain the synthesized screenshot by stitching the first screenshot and the target image.

18. The non-transitory computer-readable storage medium of claim 16, wherein the computer program executed by the processor to obtain the synthesized screenshot by synthesizing the first screenshot and the second screenshot is executed by the processor to:

obtain a third screenshot by rotating the second screenshot 180 degrees about an axis perpendicular to the special-shaped screen; and obtain the synthesized screenshot by superimposing the first screenshot and the third screenshot.

19. The non-transitory computer-readable storage medium of claim 18, wherein the computer program executed by the processor to obtain the synthesized screenshot by superimposing the first screenshot and the third screenshot is executed by the processor to:

determine, in the first screenshot, a weight $a1$ of the incomplete region of the first screenshot and a weight $b1$ of a complete region, wherein the weight $a1$ and the weight $b1$ range from 0 to 1;

determine, in an incomplete region in the third screenshot, a weight $a2$ of a symmetric region and a weight $b2$ of a dissymmetric region, wherein the weight $a2$ and the weight $b2$ range from 0 to 1; and perform a weighting operation on the first screenshot and the third screenshot according to the weight $a1$, the weight $b1$, the weight $a2$, and the weight $b2$.

20. The non-transitory computer-readable storage medium of claim 16, wherein the computer program is further executed by the processor to:

determine whether the incomplete region of the first screenshot comprises preset contents; and proceed to obtain the second screenshot, by rotating the preset interface 180 degrees about an axis perpendicular to the special-shaped screen and perform a screenshot on the preset interface rotated.

* * * * *